United States Patent

Sekine

(10) Patent No.: US 10,027,897 B2
(45) Date of Patent: Jul. 17, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hisato Sekine, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/245,339

(22) Filed: Aug. 24, 2016

(65) Prior Publication Data

US 2017/0064177 A1 Mar. 2, 2017

(30) Foreign Application Priority Data

Sep. 1, 2015 (JP) .................................. 2015-172088

(51) Int. Cl.
*H04N 5/225* (2006.01)
*H04N 5/235* (2006.01)
*G06T 5/00* (2006.01)

(52) U.S. Cl.
CPC .......... *H04N 5/2353* (2013.01); *G06T 5/003* (2013.01); *G06T 5/007* (2013.01); *H04N 5/2351* (2013.01);
(Continued)

(58) Field of Classification Search
CPC ................ H04N 5/2351; H04N 5/2353; G06T 2207/10024; G06T 2207/20012; G06T 5/003; G06T 5/007
See application file for complete search history.

(56) References Cited

U.S. PATENT DOCUMENTS 6,295,138 B1 * 9/2001 Kitagawa ........... H04N 1/40056
348/E5.041
8,340,461 B2 12/2012 Sun et al.
(Continued)

FOREIGN PATENT DOCUMENTS

| EP | 2846306 A1 | 3/2015 |
|---|---|---|
| EP | 2851865 A1 | 3/2015 |
| JP | 3614692 B2 | 1/2005 |

OTHER PUBLICATIONS

Xu et al., "Fast Image Dehazing Using Improved Dark Channel Prior", 2012 IEEE International Conference on Information Science and Technology, Wuhan, Hubei, China, pp. 663-667, Mar. 23-25, 2012.
(Continued)

*Primary Examiner* — Lin Ye
*Assistant Examiner* — John H Morehead, III
(74) *Attorney, Agent, or Firm* — Carter, DeLuca, Farrell & Schmidt, LLP

(57) ABSTRACT

It is possible to adjust brightness of an image for which contrast correction has been performed for each local area. An image processing apparatus that adjusts brightness of a processed image for which contrast correction for removing a scattered light component has been performed for each local area, including: an estimation unit configured to estimate luminance of the processed image based on luminance of an input image before the contrast correction is performed for each local area and transmittance corresponding to the luminance; a parameter calculation unit configured to calculate an exposure correction parameter based on the luminance of the input image and the luminance of the processed image estimated by the estimation unit; and an exposure correction unit configured to perform exposure correction (Continued)

for the processed image by using the exposure correction parameter.

7 Claims, 14 Drawing Sheets

(52) U.S. Cl.
CPC ............. *G06T 2207/10024* (2013.01); *G06T 2207/20012* (2013.01)

(56) References Cited

U.S. PATENT DOCUMENTS

| | | | | |
|---|---|---|---|---|
| 2003/0020974 | A1* | 1/2003 | Matsushima | G06T 5/008 358/521 |
| 2007/0237392 | A1* | 10/2007 | Ohara | H04N 1/4074 382/171 |
| 2008/0317372 | A1* | 12/2008 | Kwon | G06T 5/008 382/263 |
| 2012/0008015 | A1* | 1/2012 | Manabe | H04N 5/2355 348/234 |
| 2014/0307117 | A1* | 10/2014 | Feng | H04N 5/2355 348/218.1 |
| 2014/0355903 | A1 | 12/2014 | Sawada | |
| 2015/0131050 | A1* | 5/2015 | Bublitz | A61B 3/12 351/206 |
| 2015/0146980 | A1 | 5/2015 | Itoh et al. | |
| 2015/0243002 | A1* | 8/2015 | Hirooka | G06T 5/008 348/241 |
| 2015/0244916 | A1* | 8/2015 | Kang | H04N 5/2353 348/222.1 |

OTHER PUBLICATIONS

Kim, Jin-Hwan, et al., "Single image dehazing based on contrast enhancement." Acoustics, Speech and Signal Processing (ICASSP), 2011 IEEE International Conference on. IEEE, 2011, pp. 1273-1276.

European Search Report issued in corresponding application No. 16001768.7 dated Jan. 30, 2017.

* cited by examiner

| R1 | G2 | R3 | G4 | R5 |
|---|---|---|---|---|
| R6 | R7 | B8 | R9 | B10 |
| R11 | B12 | G13 | R14 | G15 |
| G16 | R17 | R18 | G19 | B20 |
| B21 | R22 | G23 | R24 | R25 |

DARK CHANNEL IMAGE

FIG.8A

| R1 | R2 | R3 | R4 | R5 |
|---|---|---|---|---|
| R6 | R7 | R8 | R9 | R10 |
| R11 | R12 | R13 | R14 | R15 |
| R16 | R17 | R18 | R19 | R20 |
| R21 | R22 | R23 | R24 | R25 |

R IMAGE

FIG.8B

| G1 | G2 | G3 | G4 | G5 |
|---|---|---|---|---|
| G6 | G7 | G8 | G9 | G10 |
| G11 | G12 | G13 | G14 | G15 |
| G16 | G17 | G18 | G19 | G20 |
| G21 | G22 | G23 | G24 | G25 |

G IMAGE

FIG.8C

| B1 | B2 | B3 | B4 | B5 |
|---|---|---|---|---|
| B6 | B7 | B8 | B9 | B10 |
| B11 | B12 | B13 | B14 | B15 |
| B16 | B17 | B18 | B19 | B20 |
| B21 | B22 | B23 | B24 | B25 |

B IMAGE

FIG.8D

| 190 | 190 | 190 | 190 | 190 |
|---|---|---|---|---|
| 190 | 190 | 185 | 190 | 190 |
| 180 | 190 | 190 | 190 | 190 |
| 172 | 183 | 175 | 173 | 169 |
| 170 | 180 | 170 | 170 | 175 |

LUMINANCE IMAGE
AVERAGE LUMINANCE = 182.88 ≈ 183

FIG.12A

| 0.39 | 0.45 | 0.45 | 0.45 | 0.45 |
|---|---|---|---|---|
| 0.46 | 0.45 | 0.44 | 0.44 | 0.44 |
| 0.23 | 0.45 | 0.45 | 0.45 | 0.44 |
| 0.22 | 0.22 | 0.21 | 0.22 | 0.44 |
| 0.18 | 0.18 | 0.19 | 0.23 | 0.19 |

TRANSMITTANCE IMAGE

FIG.12B

| 190 | 190 | 190 | 190 | 190 |
|---|---|---|---|---|
| 190 | 190 | 179 | 190 | 190 |
| 146 | 190 | 190 | 190 | 190 |
| 108 | 158 | 118 | 111 | 142 |
| 79 | 135 | 86 | 105 | 112 |

LUMINANCE IMAGE AFTER SCATTERED
LIGHT REMOVAL
(BEFORE EXPOSURE CORRECTION)
AVERAGE LUMINANCE = 157.96 ≈ 158

FIG.12C

| 221 | 221 | 221 | 221 | 221 |
|---|---|---|---|---|
| 221 | 221 | 208 | 221 | 221 |
| 169 | 221 | 221 | 221 | 221 |
| 125 | 183 | 137 | 129 | 165 |
| 92 | 157 | 100 | 122 | 130 |

LUMINANCE IMAGE AFTER SCATTERED
LIGHT REMOVAL
(AFTER EXPOSURE CORRECTION)
AVERAGE LUMINANCE = 183.6 ≈ 184

FIG.12D

IMAGE PROCESSING APPARATUS, IMAGE PROCESSING METHOD, AND STORAGE MEDIUM

BACKGROUND OF THE INVENTION

Field of the Invention

The present invention relates to image processing to reduce an influence of scattered light due to fine particles.

Description of the Related Art

In the field of a monitoring camera or the like, a reduction in image quality of a captured image due to fine particles (e.g., trash, dust, fog) present between a camera and a subject has become problematic. The reduction in image quality is caused by light being scattered by fine particles while passing through the air and as a result of this, the contrast of a photographed image being reduced. The degree of scattering of the light scattering varies depending on the distance to the subject. Because of this, in the case where a scene in which different distances to the subjects exist mixedly is photographed, there is a possibility that an image in which the degree of reduction in contrast differs from image area to image area is acquired. As a general contrast correction technique for the image such as this the contrast of which has been reduced, there is a technique to correct the image by calculating a histogram from the photographed image and correcting the image based on the histogram (see the Japanese Patent No. 3614692). However, with the method described in the Japanese Patent No. 3614692, it is not possible to sufficiently correct an image in which the degree of reduction in contrast differs from area to area. Consequently, as a technique to correct the reduction in contrast for each area, there is a technique that uses a dark channel prior (see the U.S. Pat. No. 8,340,461). In this technique, from the RGB minimum values (dark channel) in a local area of a photographed image, the degree of scattering of light due to fine particles is estimated and the contrast correction is performed for each local area.

However, in the case where the contrast correction for each local area is performed by using the method described in the U.S. Pat. No. 8,340,461, it is not possible to guarantee the brightness of the entire image, and therefore, there is a possibility that the brightness of the entire image becomes brighter or darker compared to appropriate brightness.

SUMMARY OF THE INVENTION

Because of this, an object of the present invention is to adjust the brightness of an image for which contrast correction has been performed for each local area to appropriate brightness.

The image processing apparatus according to the present invention is an image processing apparatus that adjusts brightness of a processed image for which contrast correction for removing a scattered light component has been performed for each local area, and includes an estimation unit configured to estimate luminance of the processed image based on luminance of an input image before the contrast correction is performed for each local area and transmittance corresponding to the luminance, a parameter calculation unit configured to calculate an exposure correction parameter based on the luminance of the input image and the luminance of the processed image estimated by the estimation unit, and an exposure correction unit configured to perform exposure correction for the processed image by using the exposure correction parameter.

Further features of the present invention will become apparent from the following description of exemplary embodiments (with reference to the attached drawings).

BRIEF DESCRIPTION OF THE DRAWINGS

FIGS. 8A to 8D are explanatory diagrams for explaining an extraction method of a reference pixel value;

FIGS. 12A to 12D are explanatory diagrams for explaining the effect of the first embodiment;

DESCRIPTION OF THE EMBODIMENTS

First Embodiment

Figure 1:
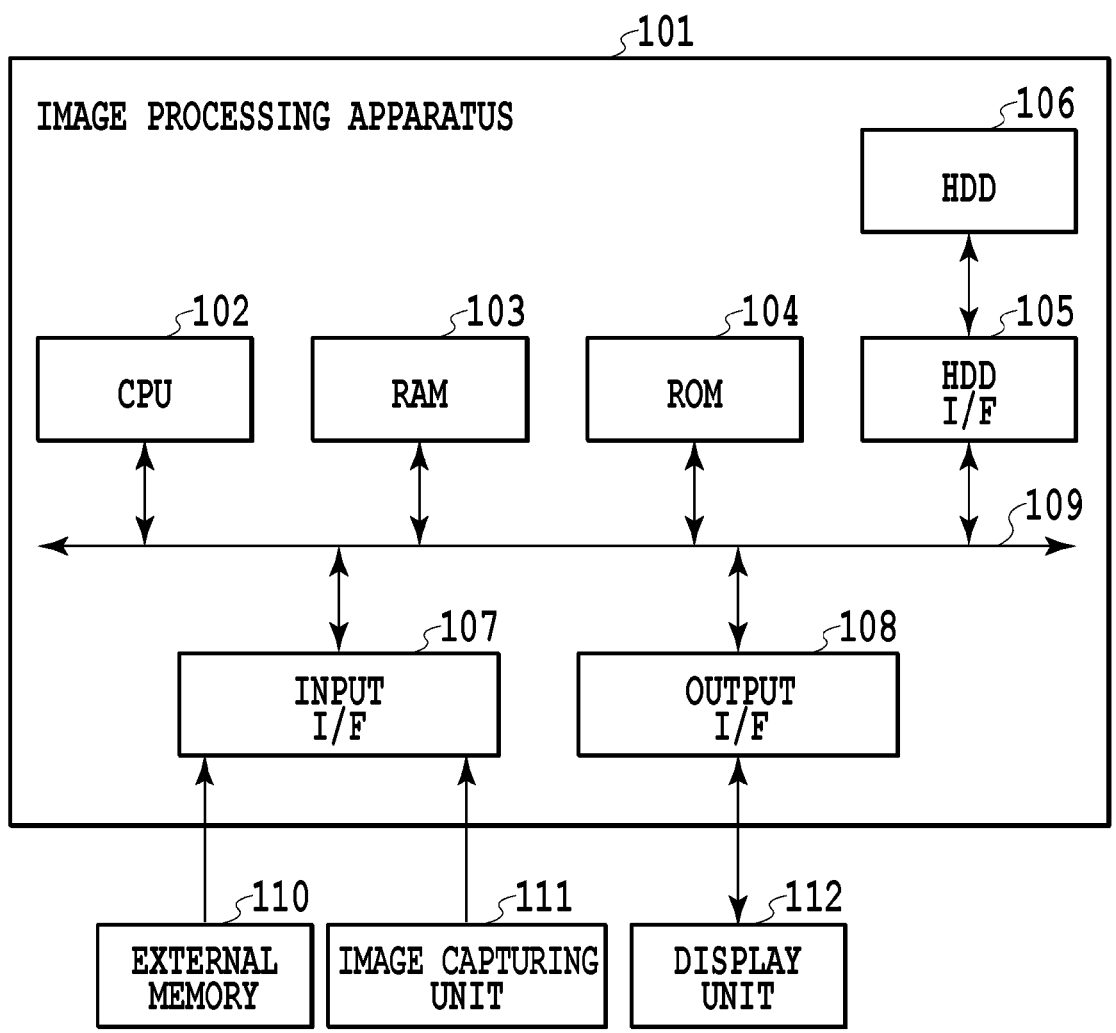
FIG. 1 is a block diagram showing a hardware configuration of an image processing apparatus in a first embodiment.

FIG. 1 is a block diagram showing a hardware configuration of an image processing apparatus 101 in a first embodiment. In FIG. 1, an image capturing apparatus including the image processing apparatus 101 in the present embodiment is shown. The image capturing apparatus shown in FIG. 1 includes an external memory 110, an image capturing unit 111, and a display unit, in addition to the image processing apparatus 101. The external memory 110 may be configured so as to be detachable from the image capturing apparatus. That is, the image capturing apparatus may not include the external memory 110.

The image processing apparatus 101 includes a CPU 102, a RAM 103, a ROM 104, an HDD I/F 105, an HDD 106, an input I/F 107, an output I/F 108, and a system bus 109.

The CPU 102 is a processor that centralizedly controls each component of the image processing apparatus 101.

The RAM 103 is a memory that functions as a main memory of the CPU 102 or a work area of the CPU 102.

The ROM 104 is a memory for storing programs in charge of processing performed in the image processing apparatus 101.

The HDD I/F 105 is an interface, such as the serial ATA (SATA). The HDD I/F 105 connects the HDD 106, which is a secondary storage device, to the system bus 109. It is possible for the CPU 102 to read data from the HDD 106 and to write data to the HDD 106 via the HDD I/F 105. Further, it is also possible for the CPU 102 to develop data stored in the HDD 106 onto the RAM 103 and to save the data developed onto the RAM 103 in the HDD 106. In the present embodiment, the CPU 102 develops a program stored in the ROM 104 or the HDD 106, for example, a program for centralizedly controlling each component, onto the RAM 103 and executes the program.

The HDD 106 is a secondary storage device, such as a hard disk drive (HDD). The HDD 106 may be a storage device, such as an optical disk drive, besides the HDD.

The input I/F 107 is a serial bus interface, such as USB and IEEE1394. The image processing apparatus 101 is connected to the external memory 110 and the image capturing unit 111 via the input I/F 107. It is possible for the CPU 102 to acquire data from the external memory 110 and the image capturing unit 111 via the input I/F 107.

The output I/F 108 is a video output interface, such as DVI (Digital Visual Interface) and HDMI (registered trademark) (High-Definition Multimedia Interface). The image processing apparatus 101 is connected to the display unit 112 via the output I/F 108.

The system bus 109 is a transfer path of various kinds of data. Each component of the image processing apparatus 101 is connected to one another via the system bus 109.

The external memory 110 is a storage medium, such as a hard disk, a memory card, a CF cark, an SD card, and a USB memory. The external memory 110 saves image data or the like processed by the image processing apparatus 101.

The image capturing unit 111 receives light information of a subject and acquires an image. The image capturing unit 111 outputs the acquired image as digital data. Hereinafter, the digital data that is output by the image capturing unit 111 is referred to as image data.

The display unit 112 is a display device, such as a display. In the present embodiment, the CPU 102 outputs image data to the display unit 112 via the output I/F 108 and the display unit 112 displays an image represented by the input image data.

As described above, in the case where fine particles, such as dust, exist between the image capturing unit 111 and a subject, the contrast of the image acquired by the image capturing unit 111 is reduced due to light scattering. Consequently, in the present embodiment, the image processing apparatus 101 generates image data in which the influence of scattered light is reduced by performing processing for the image data output by the image capturing unit 111.

[Flow of Entire Processing]

Figure 2:
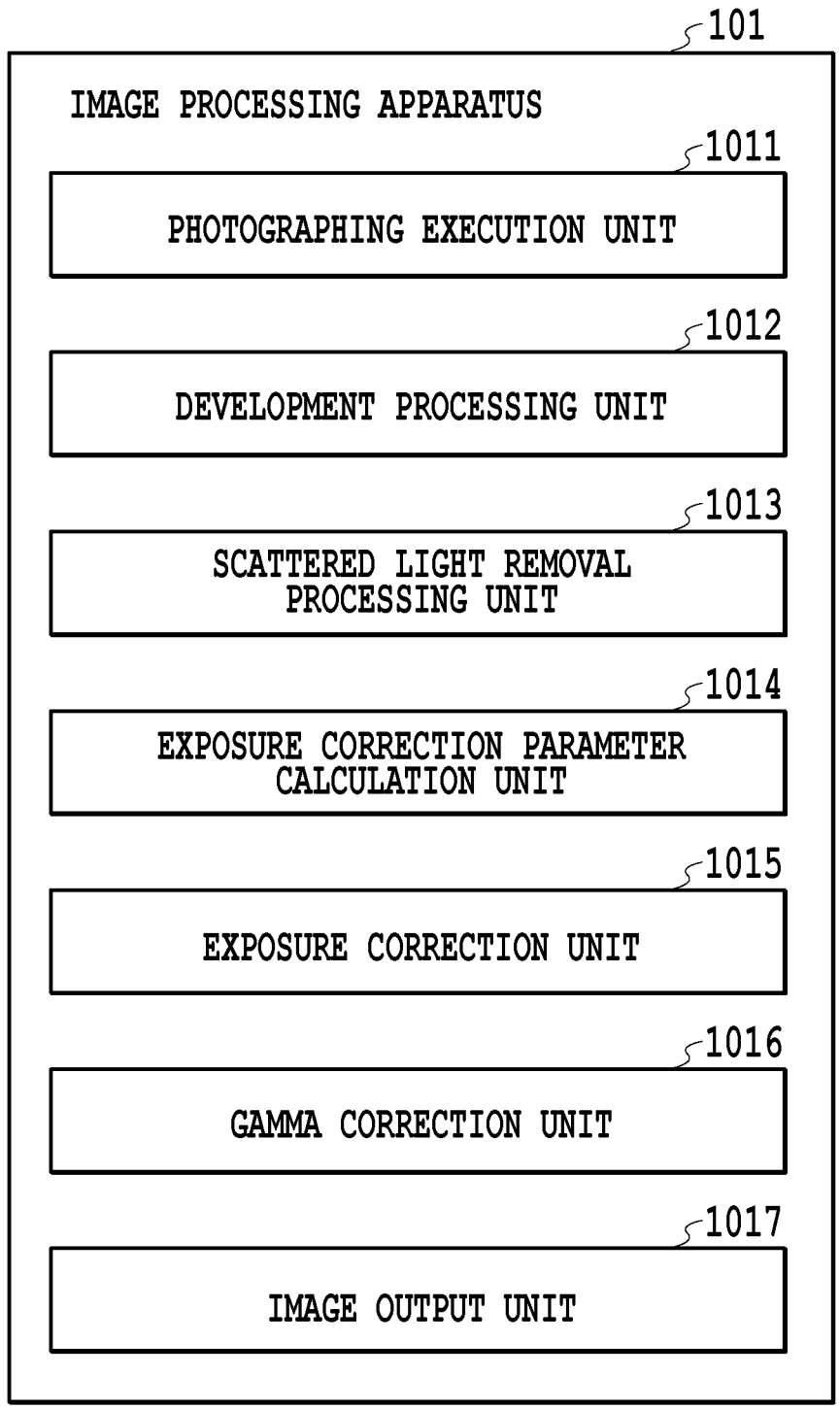
FIG. 2 is a block diagram showing a software configuration of the image processing apparatus in the first embodiment.

FIG. 2 is a block diagram showing a software configuration of the image processing apparatus 101 in the first embodiment. As shown in FIG. 2, the image processing apparatus 101 includes a photographing execution unit 1011, a development processing unit 1012, a scattered light removal processing unit 1013, an exposure correction parameter calculation unit 1014, an exposure correction unit 1015, a gamma correction unit 1016, and an image output unit 1017.

Hereinafter, by using FIG. 3, the flow of the processing in the image processing apparatus 101 of the present embodiment is explained.

Figure 3:
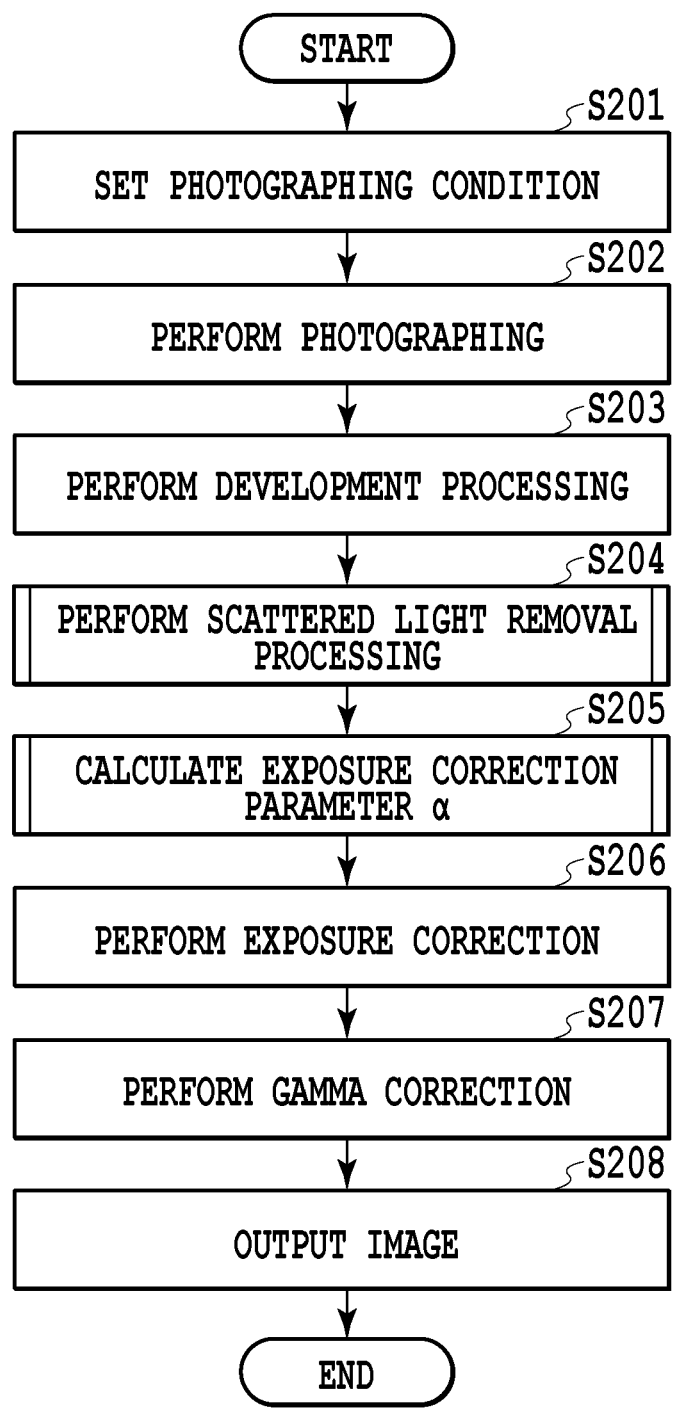
FIG. 3 is a flowchart showing processing of the image processing apparatus in the first embodiment.

FIG. 3 is a flowchart showing the processing of the image processing apparatus 101 in the first embodiment. In the present embodiment, programs in charge of the processing shown in FIG. 3 are stored in the ROM 104 or the HDD 106 and each component shown in FIG. 2 functions by the CPU 102 loading and executing the relevant program.

First, at step S201, the photographing execution unit 1011 sets photographing conditions suitable for photographing a subject to the image capturing unit 111. The photographing execution unit 1011 sets optimum photographing conditions by performing general automatic exposure control or the like.

At step S202, the photographing execution unit 1011 causes the image capturing unit 111 to drive based on the photographing conditions set in the processing at step S201 and performs photographing.

At step S203, the development processing unit 1012 performs development processing for the image data output from the image capturing unit 111 in the processing at step S202. In the development processing, general development processing, such as white balance, demosaicking, color conversion, noise reduction, and edge enhancement processing, is performed. Then, an image having colors of R, G, and B for each pixel is generated.

At step S204, the scattered light removal processing unit 1013 performs contrast correction for each local area for the image data for which the development processing has been performed in the processing at step S203. In the present embodiment, the scattered light removal processing unit 1013 performs scattered light removal processing, to be described later, as the contrast correction for each local area.

At step S205, the exposure correction parameter calculation unit 1014 calculates an exposure correction parameter α from the image data for which the contrast correction has been performed for each local area in the processing at step S204. The calculation processing of the exposure correction parameter α will be described later.

At step S206, the exposure correction unit 1015 performs exposure correction in accordance with the following expression 1 by using the exposure correction parameter α calculated in the processing at step S205.

$$o(x,y,c) = \alpha \cdot j'(x,y,c) \quad \text{(expression 1)}$$

Here, O denotes image data after the exposure correction, j' denotes image data after the scattered light removal processing, and c denotes a color plane.

At step S207, the gamma correction unit 1016 performs gamma correction for the image data (hereinafter, referred to as after-exposure correction image data) for which the exposure correction has been performed in the processing at step S206.

Finally, at step S208, the image output unit 1017 outputs the image data for which the gamma correction has been performed in the processing at step S207 to the HDD 106 via the HDD I/F 105. It may also be possible for the image output unit 1017 to save the image data in another storage medium. For example, it may also be possible for the image output unit 1017 to output the image data to the external memory 110 via the input I/F 107.

[Scattered Light Removal Processing]

Hereinafter, the scattered light removal processing at step S204 is explained.

Figure 4:
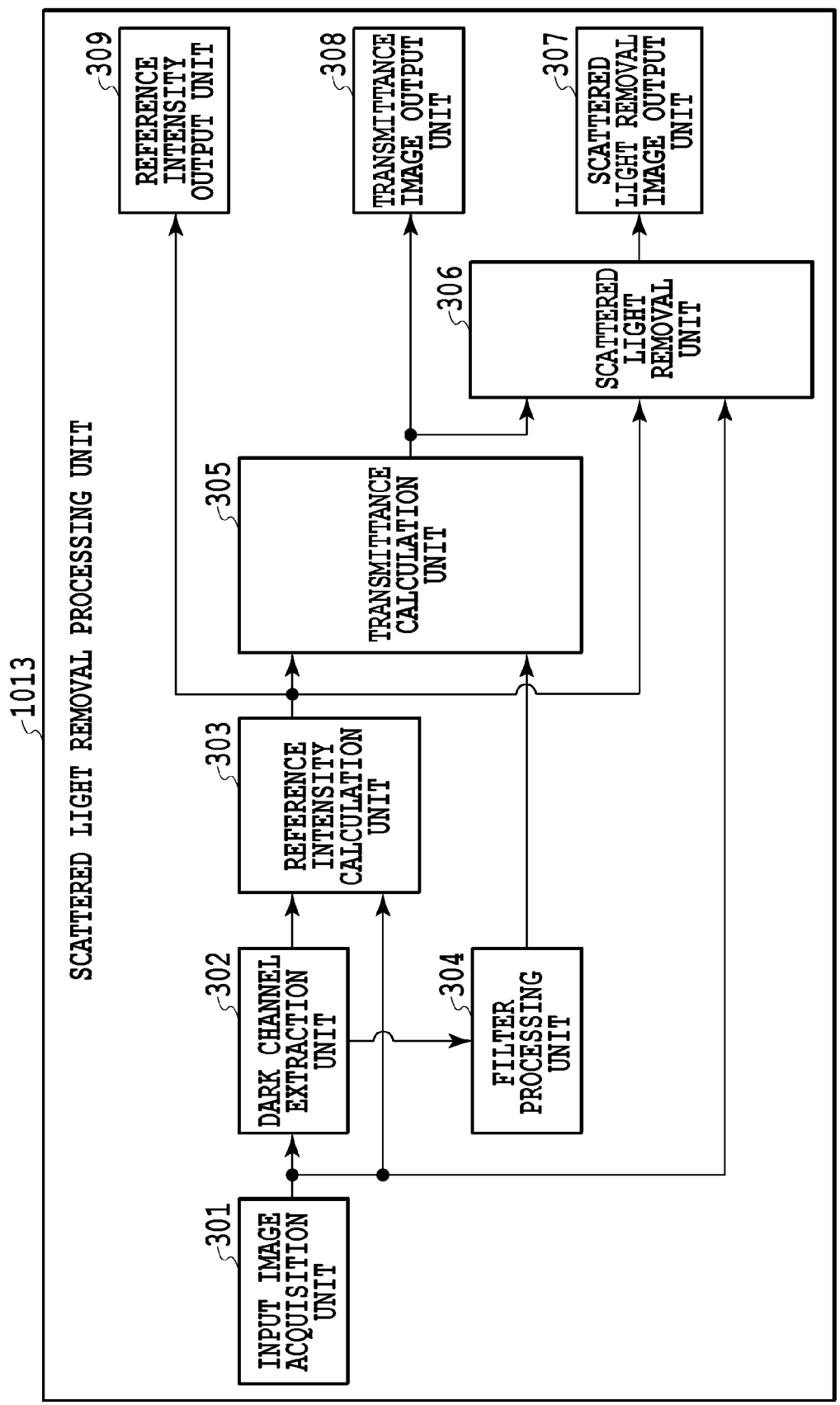
FIG. 4 is a block diagram showing an internal configuration of a scattered light removal processing unit.
Figure 14:
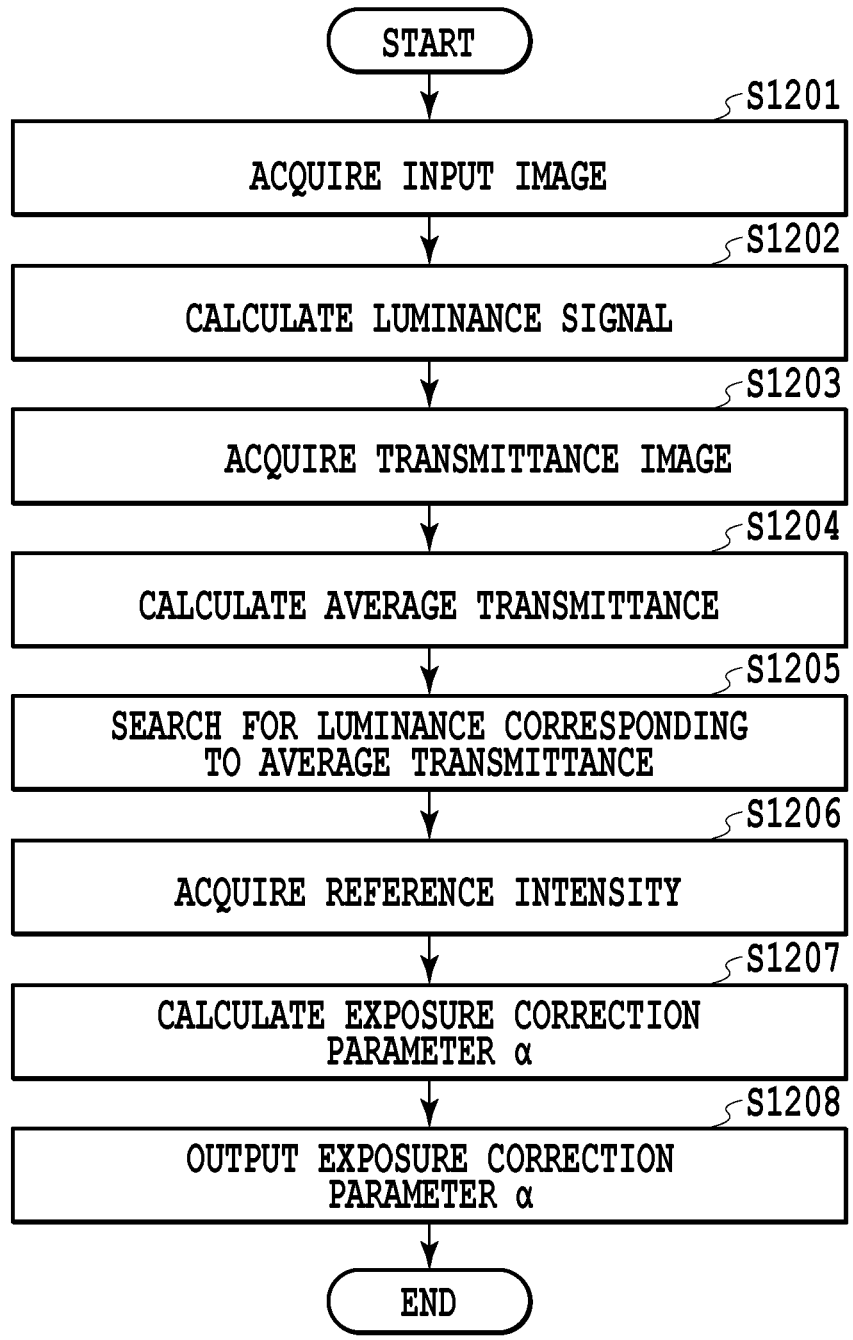
FIG. 14 is a flowchart showing processing of the exposure correction parameter calculation unit in the second embodiment.

FIG. 4 is a block diagram showing an internal configuration of the scattered light removal processing unit 1013. As shown in FIG. 14, the scattered light removal processing unit 1013 includes an input image acquisition unit 301, a dark channel extraction unit 302, a reference intensity calculation unit (also referred to as a reference intensity derivation unit) 303, a filter processing unit 304, a transmittance calculation unit 305, a scattered light removal unit 306, a scattered light removal image output unit 307, a transmittance image output unit 308, and a reference intensity output unit 309.

Figure 5:
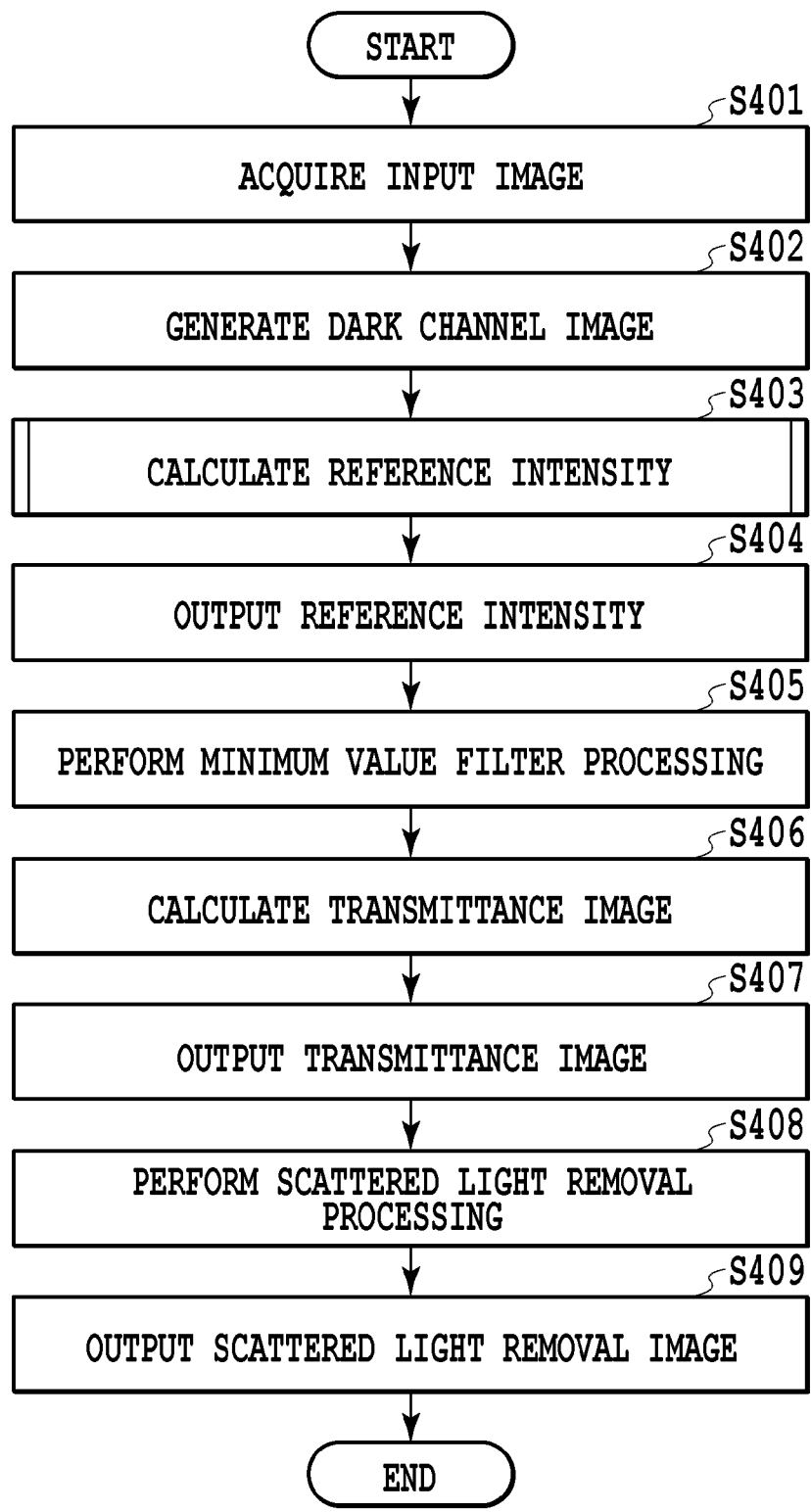
FIG. 5 is a flowchart showing processing of the scattered light removal processing unit.

FIG. 5 is a flowchart showing the processing of the scattered light removal processing unit 1013. In the present embodiment, programs in charge of the processing shown in FIG. 5 are stored in the ROM 104 or the HDD 106 and each component shown in FIG. 4 functions by the CPU 102 loading and executing the relevant program. All the components shown in FIG. 4 may not be included in the scattered light removal processing unit 1013 and a processing circuit corresponding to each component may be newly provided within the image processing apparatus 101.

First, at step S401, the input image acquisition unit 301 acquires the image data developed in the processing at step S203. Hereinafter, the image represented by the image data is referred to as an input image or a photographed image. The input image acquisition unit 301 outputs the acquired image data to the dark channel extraction unit 302, the reference intensity calculation unit 303, and the scattered light removal unit 306. Further, the input image acquisition unit 301 outputs the input image data to the HDD 106 via the HDD I/F 105. It may also be possible for the input image acquisition unit 301 to save the input image data in another storage medium. For example, it may also be possible for the input image acquisition unit 301 to output the input image data to the external memory 110 via the input I/F 107.

At step S402, the dark channel extraction unit 302 extracts a dark channel for each pixel position from the image data that is output from the input image acquisition unit 301. The dark channel extraction unit 302 outputs image data configured by putting the extracted dark channels side by side to the reference intensity calculation unit 303. Hereinafter, this image data is referred to as dark channel image data. Further, the image represented by the dark channel image data is referred to as a dark channel image.

Here, the dark channel is a channel having the smallest pixel value among the pixel values of each channel of R, G, and B in a certain pixel. In the smallest pixel value among the pixel values of each channel of R, G, and B, the proportion of the component resulting from scattered light is great. Consequently, the dark channel image is an image that reflects the intensity of the scattered light component more than that in a color image.

Figure 6:
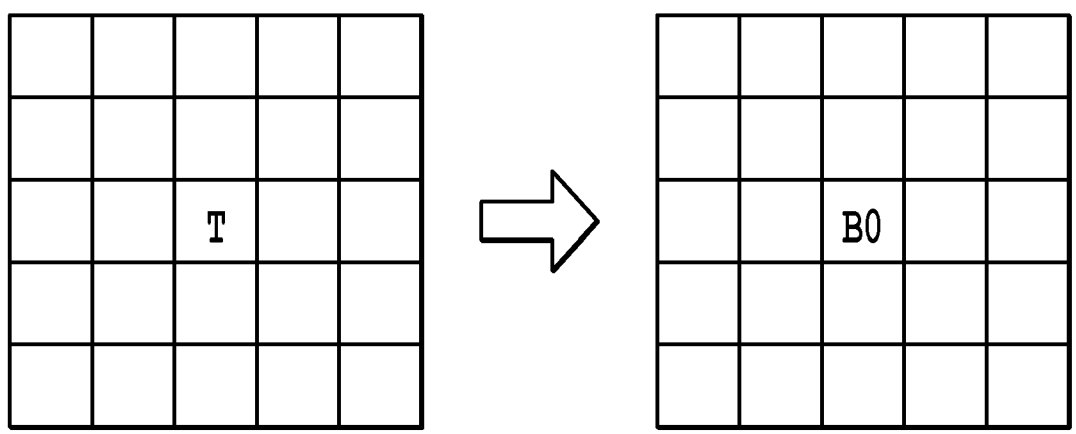
FIG. 6 is a schematic diagram showing a process in which a dark channel extraction unit derives a dark channel corresponding to a certain pixel of interest.

FIG. 6 is a schematic diagram showing a process in which the dark channel extraction unit 302 derives a dark channel corresponding to a certain pixel of interest. It is assumed that the pixel values of a pixel of interest T of an input are (R0, G0, B0) as shown in the left diagram in FIG. 6. At this time, in the case where the absolute values of the pixel values are in the order of R0>G0>B0, the dark channel of the pixel of interest T is B0 as shown in the right diagram in FIG. 6. After this, the dark channel extraction unit 302 generates dark channel image data by applying this processing to all the pixels.

At step S403, the reference intensity calculation unit 303 calculates a reference intensity of each color component of scattered light by using the dark channel image data that is output from the dark channel extraction unit 302 and the input image data that is output from the input image acquisition unit 301. The reference intensity calculation unit 303 outputs the calculated reference intensity to the transmittance calculation unit 305, the scattered light removal unit 306, and the reference intensity output unit 309. Here, the reference intensity is a value that is taken as a reference in the case where the magnitude of each color component of scattered light in each pixel position of the image data is determined. The reference intensity is determined based on the pixel value of a pixel, such as the pixel of the sky in which the scattered light component is dominant and which is blurred in white due to fog or the like. Details of this processing will be described later.

At step S404, the reference intensity output unit 309 outputs the reference intensity calculated in the processing at step S403 to the RAM 103.

At step S405, the filter processing unit 304 performs minimum value filter processing for the dark channel image data output from the dark channel extraction unit 302. Then, the filter processing unit 304 outputs the dark channel image data for which the minimum value filter processing has been performed to the transmittance calculation unit 305. Here, the minimum value filter processing is processing to reduce the possibility that the local structure or noise in an image is recognized erroneously as one resulting from scattered light.

At step S406, the transmittance calculation unit 305 determines transmittance t (x, y) in a pixel position (x, y) of the input image based on the dark channel image data after the minimum value filter processing output from the filter processing unit 304 and the reference intensity of scattered light output from the reference intensity calculation unit 303. Here, t (x, y) is expressed by an expression 2 below.

$$t(x, y) = 1.0 - \omega\left(\frac{D(x, y)}{A}\right) \quad \text{(expression 2)}$$

Here, D is the dark channel image after the minimum value filter processing output in the processing at step S405. A is the reference intensity of scattered light calculated at step S403 and ω is a coefficient assuming the transmittance in the pixel used to calculate the reference intensity of scattered light. In the present embodiment, it is assumed that ω is 0.9. It may also be possible to adjust the value of ω so that the image represented by the image data after the scattered light removal processing becomes a favorable image.

The transmittance calculation unit 305 calculates the transmittance in each pixel by substituting the acquired value for each variable in expression 2. The transmittance calculation unit 305 outputs the calculated transmittance to the scattered light removal unit 306 and the transmittance image output unit 308. It may also be possible to determine the transmittance based on, for example, a distance to a subject acquired by using a stereoscopic camera or the like in place of determining the transmittance based on expression 2.

At step S407, the transmittance image output unit 308 acquires the transmittance t (x, y) calculated in the processing at step S406 as transmittance image data and outputs the transmittance image data to the RAM 103. Hereinafter, the image represented by the transmittance image data is referred to as a transmittance image.

At step S408, the scattered light removal unit 306 performs the scattered light removal processing of the input image by using the transmittance output from the transmittance calculation unit 305, the input image data output from the input image acquisition unit 301, and the reference intensity of scattered light output from the reference intensity calculation unit 303. The scattered light removal processing is performed by using an expression 3 below.

$$J(x, y, c) = \frac{(I(x, y, c) - A)}{\max(t_0, t(x, y))} + A \quad \text{(expression 3)}$$

Here, J (x, y, c) denotes the pixel value of the image after the scattered light removal processing. I (x, y, c) denotes the pixel value of the input image, c denotes a color plane, and $t_0$ is a coefficient for adjusting the value of J. In the present embodiment, for example, $t_0$ is set to 0.1. Here, $t_0$ is a constant provided to prevent the value of J varies considerably due to a slight difference in the value of I in the case where t (x, y, c) is infinitely close to 0. It may also be possible to set $t_0$ to a value other than 0.1 so as to obtain a more favorable image.

The scattered light removal unit 306 calculates J in each pixel by substituting the acquired value for each parameter in expression 3. The scattered light removal unit 306 outputs the calculated J to the scattered light removal image output unit 307 as the image data after the scattered light removal processing. Hereinafter, the image represented by the image data after the scattered light removal processing is referred to as a scattered light removal image or a processed image.

At step S409, the scattered light removal image output unit 307 acquires the image data after the scattered light removal processing output from the scattered light removal unit 306 and outputs the image data to the HDD 106 via the HDD I/F 105.

[Calculation of Reference Intensity]

Figure 7:
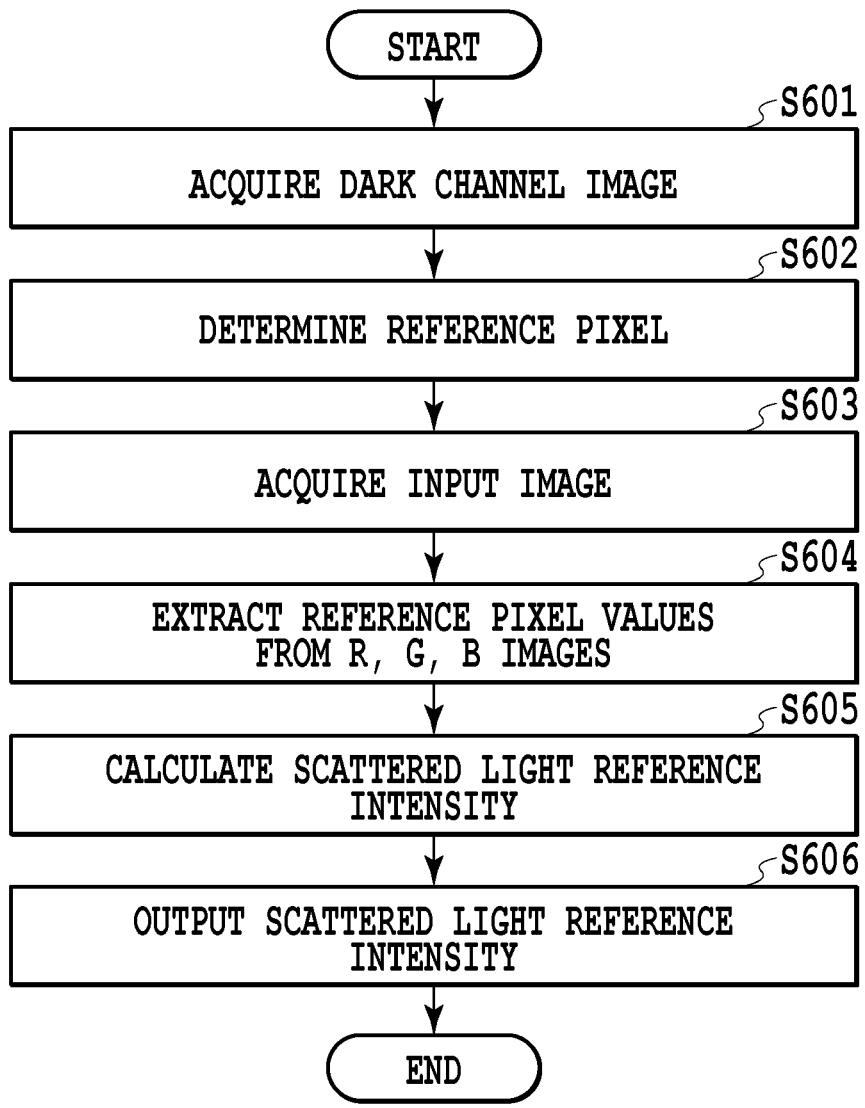
FIG. 7 is a flowchart showing processing of a reference intensity calculation unit.

Hereinafter, the reference intensity calculation processing at step S403 is explained. FIG. 7 is a flowchart showing the processing of the reference intensity calculation unit 303.

At step S601, the reference intensity calculation unit 303 acquires the dark channel image data output from the dark channel extraction unit 302.

At step S602, the reference intensity calculation unit 303 determines pixels (hereinafter, referred to as reference pixels) that are used for calculation of reference intensity based on the dark channel image data acquired at step S601. In the present embodiment, pixels the pixel value of which is within 1% of all the pixel values from the greatest pixel value among the pixels of the dark channel image are taken to be reference pixels. The dark channel image is an image in which the intensity of scattered light is reflected in the pixel value, and therefore, it can be considered that the pixel having a great pixel value in the dark channel image is the pixel in which the scattered light component is dominant.

Here, the pixels the pixel value of which is within 1% of all the pixel values from the greatest pixel value are selected as reference pixels, but the percentage is not limited to 1%. For example, it may also be possible to set the percentage in accordance with a photographed scene. Further, it may also be possible for the reference intensity calculation unit 303 to select the pixels the pixel value of which is greater than or equal to a threshold value among the pixels of the dark channel image. In the case where the reference intensity calculation unit 303 selects reference pixels by using a threshold value, it may also be possible to use a threshold value set in accordance with a photographed scene.

At step S603, the reference intensity calculation unit 303 acquires the input image data output from the input image acquisition unit 301.

step S604, the reference intensity calculation unit 303 extracts the reference pixel values used for calculation of reference intensity based on the input image data acquired in the processing at step S603 and the reference pixels determined at step S602.

Here, the reference pixel value extraction method is explained by using FIGS. 8A to 8D. FIGS. 8A to 8D are explanatory diagrams for explaining the reference pixel value extraction method.

FIG. 8A shows an example of the dark channel image. Here, the case where the reference pixel values are extracted from a dark channel image of 5×5 pixels shown in FIG. 8A is taken as an example. In FIGS. 8A to 8D, numbers 1 to 25 are allocated to each pixel in the order from the top-left pixel to the bottom-right pixel (from the top-left to the bottom-right in FIGS. 8A to 8D). To each pixel of the dark channel image, the pixel value of the color the pixel value of which is the smallest among pixel values (Rk, Gk, Bk) [k=1 to 25] of each pixel of the input image is allocated. The circle shown in FIGS. 8A to 8D indicates that the pixel attached with the circle is the pixel selected as the reference pixel. At step S604, the pixel values of the pixels corresponding to the reference pixels of the R image, the G image, and the B image of the input image are extracted as the reference pixel values. That is, in the case where pixels 3, 12, 13, and 18 are selected as reference pixels in the dark channel image as shown in FIG. 8A, the pixel values of the pixels 3, 12, 13, and 18 of the R image, the G image, and the B image are extracted as the reference pixel values, respectively, as shown in FIGS. 8B to 8D. As described above, in the present embodiment, the reference intensity calculation unit 303 calculates the reference intensity by extracting the pixel values of the pixels determined to be pixels in which scattered light is dominant for each color, and therefore, it is possible to calculate the reference intensity that reflects the wavelength-dependence of scattered light.

At step S605, the reference intensity calculation unit 303 calculates the reference intensity A of scattered light corresponding to each channel of R, G, and B based on the reference pixel values extracted in the processing at step S604. In the case where the reference pixel values extracted for the R image, the G image, and the B image in the processing at step S604 are taken to be Rs, Gs, and Bs, respectively, and the averages of the extracted reference pixel values are taken to be AR, AG, and AB, respectively, the reference intensity A is expressed by an expression 4 below.

$AR = \Sigma Rs/n$ $AG = \Sigma Gs/n$ $AB = \Sigma Bs/n$ $A = (AR + AG + AB)/3$ \quad (expression 4)

Here, n is the number of reference pixels in each image. The reference intensity calculation unit 303 calculates the reference intensity A by substituting the reference pixel values extracted in the processing at step S604 in expression 4.

At step S606, the reference intensity calculation unit 303 outputs the reference intensity A of scattered light calculated in the processing at step S605 to the transmittance calculation unit 305, the scattered light removal unit 306, and the reference intensity output unit 309.

The above is the reference intensity calculation processing of scattered light in the present embodiment. In this processing, pixels that are used for the reference intensity calculation are determined based the dark channel image, and therefore, it is possible to exactly find the reference intensity.

[Calculation of Exposure Correction Parameter]

Hereinafter, the exposure correction parameter calculation processing at step S205 is explained.

Figure 9:
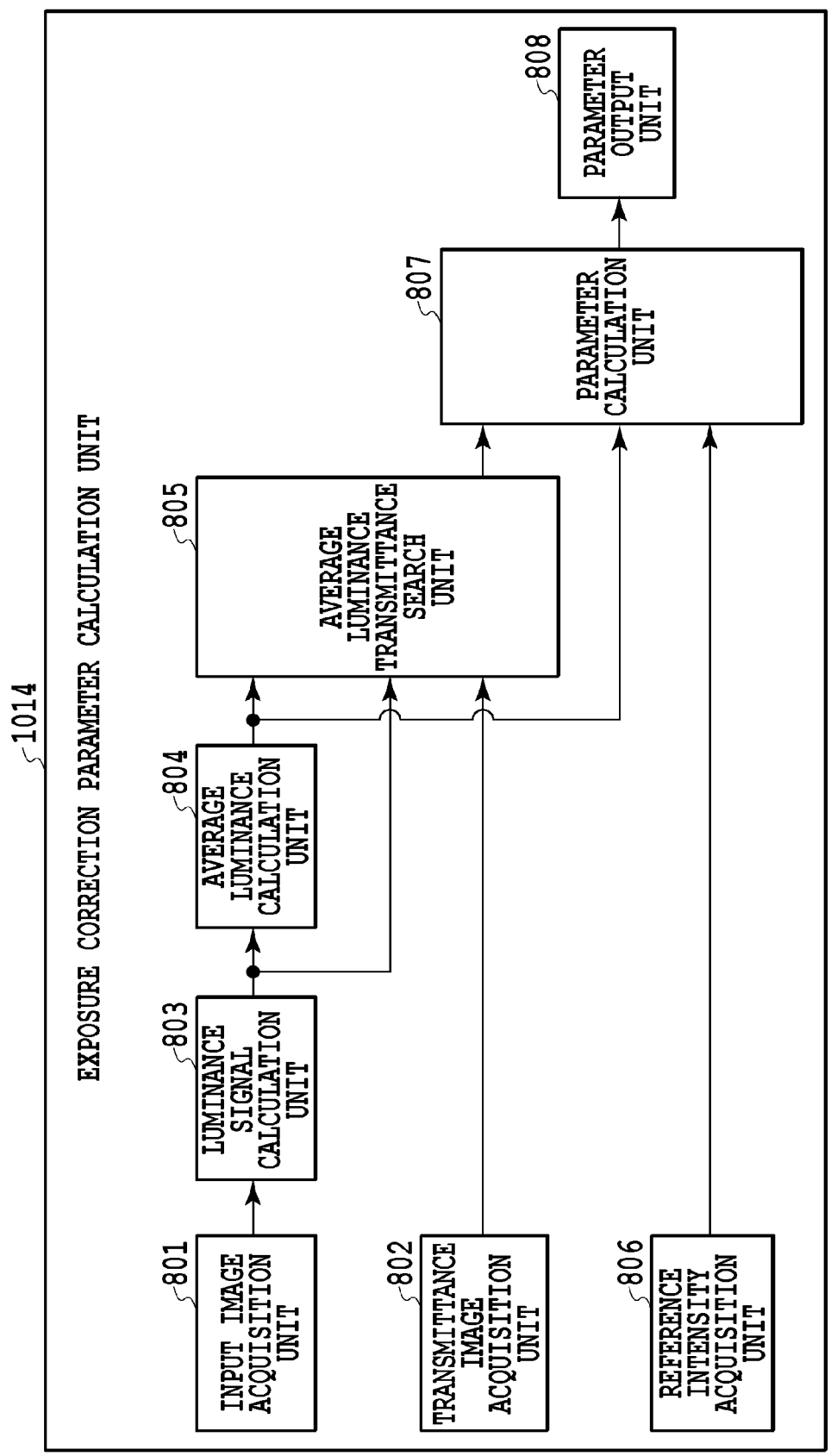
FIG. 9 is a block diagram showing an internal configuration of an exposure correction parameter calculation unit in the first embodiment.

FIG. 9 is a block diagram showing an internal configuration of the exposure correction parameter calculation unit 1014 in the first embodiment. As shown in FIG. 9, the exposure correction parameter calculation unit 1014 includes an input image acquisition unit 801, a transmittance image acquisition unit 802, a luminance signal calculation unit 803, an average luminance calculation unit 804, an average luminance transmittance search unit 805, a reference intensity acquisition unit 806, a parameter calculation unit 807, and a parameter output unit 808.

Figure 10:
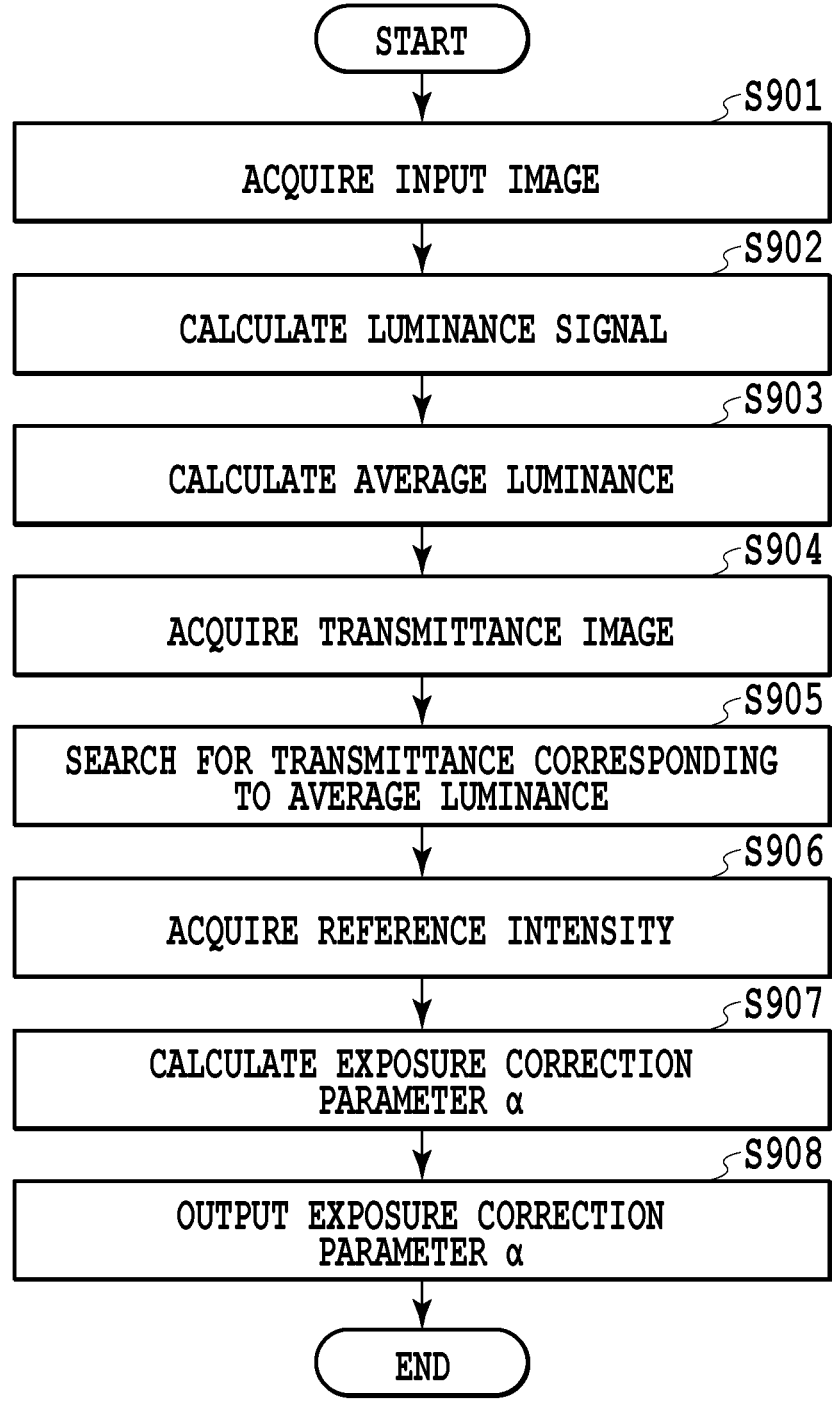
FIG. 10 is a flowchart showing processing of the exposure correction parameter calculation unit in the first embodiment.

FIG. 10 is a flowchart showing processing of the exposure correction parameter calculation unit 1014 in the first embodiment. In the present embodiment, programs in charge of the processing shown in FIG. 10 are stored in the ROM 104 or the HDD 106 and each component shown in FIG. 9 functions by the CPU 102 loading and executing the relevant program. All the components shown in FIG. 9 may not be included in the exposure correction parameter calculation unit 1014 and a processing circuit corresponding to each component may be newly provided within the image processing apparatus 101.

First, at step S901, the input image acquisition unit 801 acquires the input image data stored in the HDD 106 in the processing at step S401 from the HDD 106.

At step S902, the luminance signal calculation unit 803 generates a luminance signal from the input data acquired in the processing at step S901 and outputs the luminance signal to the average luminance calculation unit 804 and the average luminance transmittance search unit 805 as luminance image data. In the present embodiment, the luminance signal calculation unit 803 generates the luminance signal by using a general generation expression of a luminance signal as shown below.

$$Y = 0.257*R + 0.504*G + 0.098*B \quad \text{(expression 5)}$$

The above expression 5 is an expression for generating luminance Y from RGB values of input image data. The generation expression of a luminance signal is not limited to this and an expression other than expression 5 may be accepted.

At step S903, the average luminance calculation unit 804 calculates average luminance of the entire image from the luminance image data output from the luminance signal calculation unit 803. Then, the average luminance calculation unit 804 outputs the calculated average luminance to the average luminance transmittance search unit 805 and the parameter calculation unit 807.

At step S904, the transmittance image acquisition unit 802 acquires the transmittance image data stored in the RAM 103 at step S204 shown in FIG. 3, specifically, in the processing at step S407 shown in FIG. 5 and outputs the transmittance image data to the average luminance transmittance search unit 805.

At step S905, the average luminance transmittance search unit 805 searches for transmittance corresponding to the average luminance by using the average luminance, the luminance image data, and the transmittance image data. Then, the average luminance transmittance search unit 805 outputs the transmittance corresponding to the average luminance to the parameter calculation unit 807.

Figure 11A:
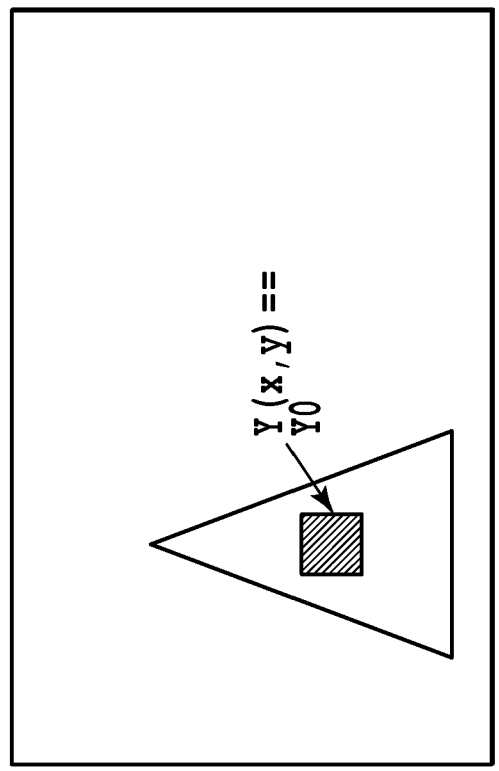
FIGS. 11A and 11B are explanatory diagrams for explaining processing to search for transmittance corresponding to average luminance.
Figure 11B:
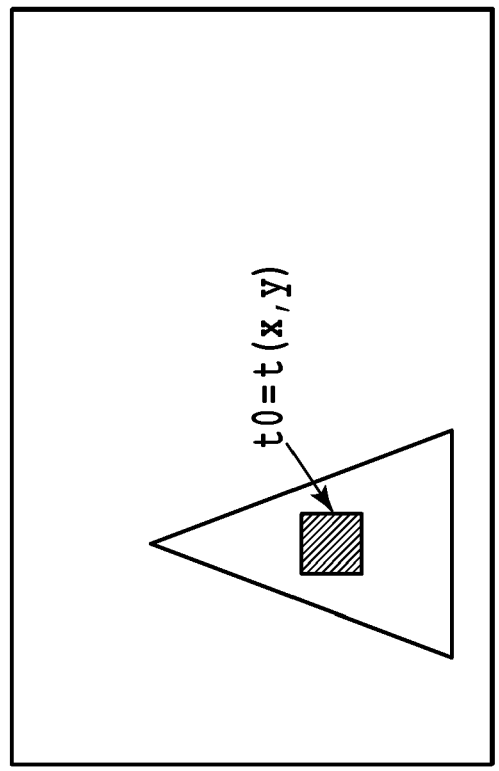

Here, the search processing of transmittance corresponding to the average luminance is explained by using FIGS. 11A and 11B. FIGS. 11A and 11B are explanatory diagrams for explaining the search processing of transmittance corresponding to the average luminance. In FIGS. 11A and 11B, a luminance image (FIG. 11A) showing the luminance and a transmittance image (FIG. 11B) showing the transmittance of an input image obtained by photographing a triangular object are shown, respectively. Here, the average luminance input by the average luminance transmittance search unit 805 is taken to be Y0. The average luminance transmittance search unit 805 searches for an area including one or a plurality of pixels indicating the same luminance as Y0 within the luminance image shown in FIG. 11A. The hatched area in FIG. 11A represents an area indicating the same luminance as Y0. Next, the average luminance transmittance search unit 805 searches for an area (hatched area in FIG. 11B) corresponding to the area indicating the same luminance as Y0 within the transmittance image. Finally, the average luminance transmittance search unit 805 acquires the transmittance in each pixel position in the hatched area in FIG. 11B and calculates the average value thereof as transmittance t0 corresponding to the average luminance. Here, the average luminance transmittance search unit 805 searches for the area indicating the same luminance as Y0, but it may also be possible for the average luminance transmittance search unit 805 to search for an area indicating the luminance corresponding to Y0. For example, in the case where the Y0 is a value including a decimal point, it may also be possible for the average luminance transmittance search unit 805 to search for an area indicating the same luminance as the value obtained by rounding off Y0 into the nearest integer. Further, for example, it may also be possible for the average luminance transmittance search unit 805 to search for an area indicating luminance which differs from Y0 by a threshold value determined in advance or less.

At step S906, the reference intensity acquisition unit 806 acquires the reference intensity stored in the RAM 103 at step S204 shown in FIG. 3, specifically in the processing at step S404 shown in FIG. 5 and outputs the reference intensity to the parameter calculation unit 807.

At step S907, the parameter calculation unit 807 calculates the exposure correction parameter α in accordance with the following expression 6 and 7 by using the average luminance calculated in the processing at step S903, the transmittance corresponding to the average luminance, which is calculated in the processing at step S905, and the reference intensity acquired in the processing at step S906.

$$Y' = \frac{(Y0 - A)}{t0} + A \quad \text{(expression 6)}$$

$$\alpha = \frac{Y0}{Y'} \quad \text{(expression 7)}$$

First, the parameter calculation unit 807 estimates average luminance of a scattered light removal image, i.e., average luminance Y' in the case where the scattered light component is removed, by using expression 6. Y0 is the average luminance calculated in the processing at step S903. A is the reference intensity of scattered light calculated in the processing at step S605. Next, the parameter calculation unit 807 calculates the exposure correction parameter α in accordance with expression 7, i.e., by dividing Y0 by Y'. At step S908, the parameter output unit 808 outputs the exposure correction parameter α calculated in the processing at step S907 to the exposure correction unit 1015.

The above is the calculation method of an exposure correction parameter in the present embodiment.

Here, the effect of the present embodiment is explained by using FIGS. 12A to 12D. FIGS. 12A to 12D are explanatory diagrams for explaining the effect of the first embodiment.

In FIGS. 12A and 12B, examples of a luminance image and a transmittance image obtained from the input image are shown. In FIGS. 12A and 12B, the position of a pixel having the luminance corresponding to the average luminance Y0 (average value 182.88≈183 calculated from the luminance in each pixel position shown in FIG. 12A) is shown by hatching. From FIG. 12B, it is known that the transmittance t0 corresponding to the average luminance is 0.22.

In FIG. 12C, the luminance image obtained from the scattered light removal image (image obtained by performing scattered light removal processing for the above-described input image), which is the luminance image before exposure correction, is shown. The average luminance in FIG. 12C is 157.96≈158, and therefore, it is known that there is a difference from the average luminance Y0 of the input image. That is, it cannot be said that the brightness of the image before the exposure correction shown in FIG. 12C is appropriate brightness.

Here, the reference intensity A of scattered light is 190. This value is a value obtained by applying the reference intensity calculation processing at S403 described above to the R image, the G image, and the B image (not shown) obtained from the input image. Then, from expression 6, Y' is estimated as follows.

$Y'=(Y0-A)/t0+A=157.64$

As is obvious from that the calculated Y' becomes a value close to the average luminance (=157.96) in FIG. 12C, it is possible to exactly estimate the average luminance of the scattered light removal image by using expression 6.

Then, by dividing Y0 by the estimated Y', α is calculated as follows.

$α=Y0/Y'=182.88/157.64≈1.16$

In FIG. 12D, the luminance image obtained from the scattered light removal image (image obtained by performing scattered light removal processing for the above-described input image), which is the luminance image after performing the exposure correction using the calculated α, is shown. The average luminance in FIG. 12D is 183.6≈184 and it is known that the value is close to the average luminance Y0≈183 in FIG. 12A. That is, it is known that by applying the exposure correction in the present embodiment to the image after the scattered light removal processing, it is possible to adjust the brightness of the image after the scattered light removal processing to appropriate brightness.

As described above, in the present embodiment, by using the appropriate exposure value of the input image (corresponding to the average luminance in the present embodiment) and the transmittance (corresponding to the transmittance corresponding to the average luminance in the present embodiment) corresponding to the appropriate exposure value, how the appropriate exposure value of the input image varies is estimated from expression 6. Consequently, compared to the general technique to calculate a histogram or the like of an image and to perform exposure correction by using the extension of histogram from the histogram or the like, it is possible to perform exposure correction more simply in the present embodiment without the need to calculate a histogram or the like. Further, by performing exposure correction based on the estimation such as this, it is possible to adjust the brightness of the image after the scattered light removal processing to appropriate brightness as shown in FIG. 12D.

In the present embodiment, as an index indicating an appropriate exposure value, the average luminance is taken as an example, but it may also be possible to use a parameter other than the average luminance, for example, such as approximate luminance of a photographed scene, which is obtained from an exposure meter incorporated in an image capturing apparatus, as the appropriate exposure value. According to such an aspect, it is possible to estimate how the appropriate exposure value of an input image varies more simply.

Second Embodiment

In the first embodiment, the case is taken as an example where the exposure correction parameter is calculated by calculating the average luminance and by searching for transmittance corresponding to the calculated average luminance. In the present embodiment, first, the average transmittance is calculated and then by searching for luminance corresponding to the average transmittance, the exposure correction parameter is calculated.

An image processing apparatus in the present embodiment includes an exposure correction parameter calculation unit 2014 in place of the exposure correction parameter calculation unit 1014. The other configurations of the image processing apparatus and the flow of the entire processing of the image processing apparatus are the same as those of the first embodiment. Consequently, in the following, only exposure correction parameter calculation processing in the present embodiment is explained.

Figure 13:
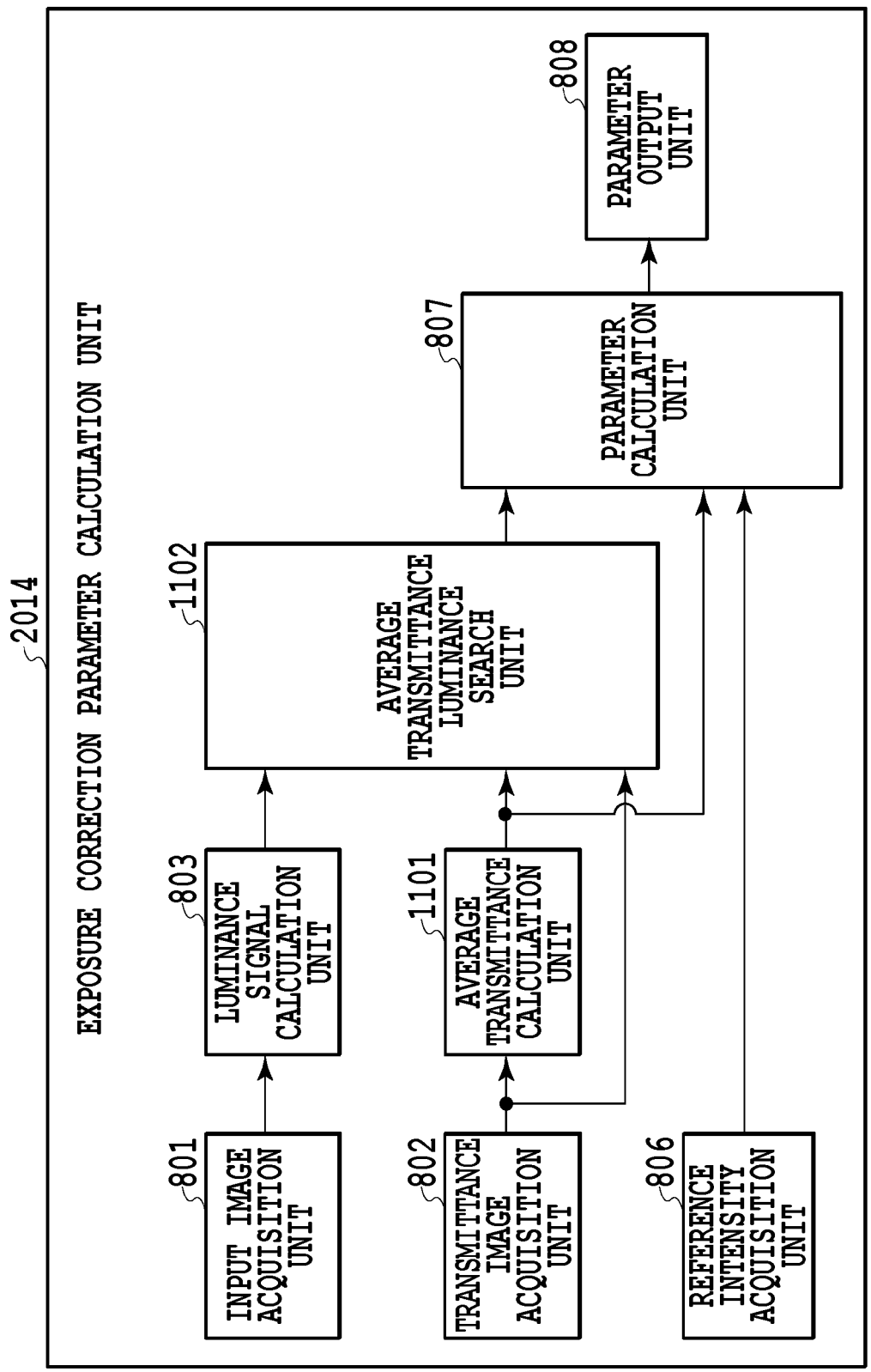
FIG. 13 is a block diagram showing an internal configuration of an exposure correction parameter calculation unit in a second embodiment.

FIG. 13 is a block diagram showing an internal configuration of the exposure correction parameter calculation unit 2014 in the second embodiment. As shown in FIG. 13, the exposure correction parameter calculation unit 2014 in the second embodiment includes the input image acquisition unit 801, the transmittance image acquisition unit 802, the luminance signal calculation unit 803, an average transmittance calculation unit 1101, an average transmittance luminance search unit 1102, the reference intensity acquisition unit 806, the parameter calculation unit 807, and the parameter output unit 808.

FIG. 14 is a flowchart showing processing of the exposure correction parameter calculation unit 2014 in the second embodiment. In the present embodiment, programs in charge of the processing shown in FIG. 14 are stored in the ROM 104 or the HDD 106 and each component shown in FIG. 13 functions by the CPU 102 loading and executing the relevant program. All the components shown in FIG. 13 may not be included in the exposure correction parameter calculation unit and a processing circuit corresponding to each block may be newly provided within the image processing apparatus.

First at step S1201, the input image acquisition unit 801 acquires the input image data stored in the HDD 106 in the processing at step S401 from the HDD 106.

At step S1202, the luminance signal calculation unit 803 generates a luminance signal from the input image data acquired in the processing at step S901 and outputs the luminance signal to the average transmittance luminance search unit 1102 as luminance image data. The processing to generate a luminance signal is the same as the processing at step S902.

At step S1203, the transmittance image acquisition unit 802 acquires the transmittance image data stored in the RAM 103 at step S204 shown in FIG. 3, specifically, in the processing at step S407 shown in FIG. 5 and outputs the transmittance image data to the average transmittance calculation unit 1101.

At step S1204, the average transmittance calculation unit 1101 calculates average transmittance of the entire image from the transmittance image data acquired in the processing at step S1203. Then, the average transmittance calculation unit 1101 outputs the calculated average transmittance to the average transmittance luminance search unit 1102.

At step S1205, the average transmittance luminance search unit 1102 searches for luminance corresponding to the average transmittance by using the average transmittance, the luminance image data, and the transmittance image data. Then, the average transmittance luminance search unit 1102 outputs the luminance corresponding to the average transmittance to the parameter calculation unit 807. The processing to search for luminance corresponding to the average transmittance is performed in the same manner as that in which the processing to search for transmittance corresponding to the average luminance at step S905 is performed. Brief explanation is given. First, the average transmittance luminance search unit 1102 searches for the pixel position indicating the transmittance corresponding to the input average transmittance by using the transmittance image data. Next, the average transmittance luminance search unit 1102 acquires the luminance in each pixel position that has been searched for from the luminance image data. Then, the average transmittance luminance search unit 1102 calculates an average value of the acquired luminance as the luminance corresponding to the average transmittance.

At step S1206, the reference intensity acquisition unit 806 acquires the reference intensity stored in the RAM 103 at step S204 shown in FIG. 3, specifically, in the processing at step S404 shown in FIG. 5 and outputs the reference intensity to the parameter calculation unit 807.

At step S1207, the parameter calculation unit 807 calculates the exposure correction parameter α in accordance with expressions 6 and 7 by using the average transmittance calculated in the processing at step S1204, the luminance corresponding to the average transmittance calculated in the processing at step S1205, and the reference intensity acquired at step S1206. At this time, as Y0 in expression 6, in place of the average luminance, the luminance corresponding to the average transmittance calculated in the processing as step S1205 is set. Further, as t0 in expression 6, in place of the transmittance corresponding to the average luminance, the average transmittance calculated in the processing at step S1204 is set. At step S1208, the parameter output unit 808 outputs the exposure correction parameter α calculated in the processing at step S1207 to the exposure correction unit 1015.

The above is the calculation method of an exposure correction parameter in the present embodiment.

As explained above, in the present embodiment, by using the appropriate exposure value (corresponding to the luminance corresponding to the average transmittance in the present embodiment) of the input image and the transmittance (corresponding to the average transmittance in the present embodiment) corresponding to the appropriate exposure value, how the appropriate exposure value of the input image varies is estimated from expression 6. With such an aspect, it is possible to perform exposure correction more simply without the need to calculate a histogram or the like as in the first embodiment. Further, by performing the exposure correction based on the estimation such as this, it is possible to adjust the brightness of the image after the scattered light removal processing to appropriate brightness.

In the above describe embodiment, the example is described in which up to the processing to output the reference intensity and the processing to output the transmittance image are performed, but these pieces of processing may be skipped in accordance with the necessity, and it is only required to be able to output at least a scattered light removal image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to adjust the brightness of an image for which contrast correction has been performed for each local area to appropriate brightness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-172088, filed Sep. 1, 2015, which is hereby incorporated by reference wherein in its entirety.

What is claimed is:

1. An image processing apparatus that adjusts brightness of a processed image for which a contrast correction for removing a scattered light component has been performed, the apparatus comprising:
one or more processors; and
a memory including stored thereon instructions that, when executed by the one or more processors, cause the image processing apparatus to:
calculate an average of luminance in an input image;
derive reference intensity of the scattered light from the input image;

calculate an average of transmittance in one or a plurality of pixel positions having luminance corresponding to the average of luminance in the input image;

estimate an average of the luminance of the processed image based on the average of the luminance in the input image, the average of the transmittance, and the reference intensity of scattered light;

calculate an exposure correction parameter based on the average of the luminance in the input image and the average of the luminance of the processed image; and perform an exposure correction for the processed image by using the exposure correction parameter.

2. The image processing apparatus according to claim 1, wherein the instructions that, when executed by the one or more processors, further cause the image processing apparatus to:

calculate an average of the transmittance of the input image, wherein the average of luminance is calculated by causing the image processing apparatus to:

calculate an average for luminance in one or a plurality of pixel positions having transmittance corresponding to the average of transmittance calculated in the input image.

3. The image processing apparatus according to claim 1, wherein an exposure correction parameter is calculated by dividing the calculated average of the luminance in the input image by the estimated average of the luminance.

4. The image processing apparatus according to claim 1, wherein the luminance of the input image is luminance obtained from an exposure meter incorporated in an image capturing apparatus.

5. An image processing apparatus comprising:
one or more processors; and
a memory including stored thereon instructions that, when executed by the one or more processors, cause the image processing apparatus to:
acquire a captured image obtained by performing image capturing;
generate a processed image by performing a contrast correction to remove a scattered light component included in a pixel value for each pixel position for the acquired captured image;
derive reference intensity of the scattered light from the captured image;
calculate an average of transmittance in one or a plurality of pixel positions having luminance corresponding to the average of luminance in the captured image;
estimate an average of the luminance of the processed image based on the average of luminance of the captured image, the average of the transmittance, and the reference intensity of scattered light;
calculate an exposure correction parameter based on the average of the luminance of the captured image and the average of the estimated luminance of the processed image; and
perform an exposure correction for the processed image by using the exposure correction parameter.

6. An image processing method of adjusting brightness of a processed image for which a contrast correction for removing a scattered light component has been performed for each local area, the method comprising:
calculating an average of luminance in an input image;
deriving reference intensity of the scattered light from the input image;
calculating an average of transmittance in one or a plurality of pixel positions having luminance corresponding to the average of luminance in the input image;
estimating an average of the luminance of the processed image based on the average of the luminance in the input image, the average of the transmittance, and the reference intensity of scattered light;
calculating an exposure correction parameter based on the luminance of the input image, the average of the luminance in the input image, and the average of the luminance of the processed image; and
performing an exposure correction for the processed image by using the exposure correction parameter.

7. A non-transitory computer readable storage medium storing a program for causing a computer to perform an image processing method of adjusting brightness of a processed image for which a contrast correction for removing a scattered light component has been performed for each local area, the method comprising:
calculating an average of luminance in an input image;
deriving reference intensity of the scattered light from the input image;
calculating an average of transmittance in one or a plurality of pixel positions having luminance corresponding to the average of luminance in the input image;
estimating an average of the luminance of the processed image based on the average of the luminance in the input image, the average of the transmittance, and the reference intensity of scattered light;
calculating an exposure correction parameter based on the luminance of the input image, the average of the luminance in the input image, and the average of the processed image; and
performing an exposure correction for the processed image by using the exposure correction parameter.

* * * * *